(12) United States Patent
Maclaughlin et al.

(10) Patent No.: US 11,718,728 B2
(45) Date of Patent: Aug. 8, 2023

(54) SINGLE LAYER POLYMER FILMS AND ELECTRONIC DEVICES

(71) Applicant: DUPONT ELECTRONICS, INC., Wilmington, DE (US)

(72) Inventors: Laila Maclaughlin, Stoutsville, OH (US); Husnu Alp Alidedeoglu, New Albany, OH (US); Christopher Robert Becks, Grove City, OH (US); Thomas Edward Carney, Orient, OH (US); Scott John Herrmann, Gahanna, OH (US); Joseph Casey Johnson, Pickerington, OH (US)

(73) Assignee: DUPONT ELECTRONICS, INC., Wilmington, DE (US)

( * ) Notice: Subject to any disclaimer, the term of this patent is extended or adjusted under 35 U.S.C. 154(b) by 281 days.

(21) Appl. No.: 17/088,249

(22) Filed: Nov. 3, 2020

(65) Prior Publication Data
US 2021/0155768 A1    May 27, 2021

Related U.S. Application Data

(60) Provisional application No. 62/938,665, filed on Nov. 21, 2019.

(51) Int. Cl.
*C08K 3/04*    (2006.01)
*C08K 5/01*    (2006.01)
*C08K 3/36*    (2006.01)
*C08G 73/10*   (2006.01)

(52) U.S. Cl.
CPC ............ *C08K 3/04* (2013.01); *C08G 73/1067* (2013.01); *C08K 3/36* (2013.01); *C08K 5/01* (2013.01); *C08K 2201/005* (2013.01)

(58) Field of Classification Search
CPC ... C08K 3/04; C08K 5/01; C08K 3/36; C08G 73/10
USPC .......................................................... 524/462
See application file for complete search history.

(56) References Cited

U.S. PATENT DOCUMENTS

| | | |
|---|---|---|
| 5,166,308 A | 11/1992 | Kreuz et al. |
| 5,298,331 A | 3/1994 | Kanakarajan et al. |
| 9,383,482 B2 | 7/2016 | Walker et al. |
| 9,469,781 B2 | 10/2016 | Carney et al. |
| 9,481,150 B2 | 11/2016 | Carney et al. |
| 9,481,809 B2 | 11/2016 | Carney et al. |
| 2013/0029166 A1* | 1/2013 | Carney ............ C08J 5/18 428/473.5 |
| 2013/0196134 A1* | 8/2013 | Carney ............ C08J 5/18 428/220 |
| 2013/0236697 A1 | 9/2013 | Walker et al. |

FOREIGN PATENT DOCUMENTS

WO    WO-2016084777 A1 *    6/2016    ............ C08G 73/10

* cited by examiner

*Primary Examiner* — Deve V Hall

(57) ABSTRACT

In one aspect, a single layer polymer film includes 25 to 97.5 wt % of a polyimide having a refractive index of 1.74 or less, 0.5 to 20 wt % of a matting agent and 1 to 30 wt % of a black colorant. On an air side, the single layer polymer film has an L* color of 33 or less and a 60° gloss of 10 or less. In another aspect, a single layer polymer film includes 80 to 99 wt % of a polyimide having a refractive index of 1.74 or less and 1 to 30 wt % of a black colorant. A surface of the single layer polymer film has been textured and has a maximum roughness ($S_{pv}$) of 7 μm or more, an L* of 33 or less and a 60° gloss of 10 or less.

20 Claims, No Drawings

SINGLE LAYER POLYMER FILMS AND ELECTRONIC DEVICES

FIELD OF DISCLOSURE

The field of this disclosure is single layer polymer films, coverlays and electronic devices.

BACKGROUND OF THE DISCLOSURE

Industry increasingly desires polyimide films for electronic application to be matte in appearance, have a specific color, durability to handling and circuit processing, and when used as a coverlay, provide security against unwanted visual inspection of the electronic components protected by the coverlay. Single layer matte luster films do not have an L* color less than 30 providing deep, rich saturated colors desired by industry. Typically, as the amount of matting agent is increased the color of the film becomes muted. The effect of increased surface roughness from the matting agent is the dilution of the pigment color so that it appears lighter and less saturated. This is caused by the dilution of the diffuse reflectance (where pigment color is perceived) by the increased scatter of the specular reflectance (white light). The rougher the surface, the lower the gloss and greater the scatter of the specular reflectance. Thus, as gloss decreases, L* (lightness) typically increases. Adding more colorant does not decrease the L* color. Thus, simultaneously achieving low gloss and low L* color is difficult. To overcome these challenges, U.S. Pat. Nos. 9,469,781, 9,481,150 and 9,481,809 use a multilayer structure in which a thin polyimide layer incorporating blends of matting agents, carbon black and submicron particles is adhered to a thicker base polyimide layer, such that the multilayer film is able to achieve the desired combination of both low L* color and low gloss. The success of multilayer coverlay in the circuit production depends on the etching thickness during the pumice, deseamer, and plasma processes. With the very thin outer layer of a multilayer film, there is a risk of etching the outer layer of the film during these processes, exposing the base layer, which can result in significant gloss and color changes.

As electronic devices and their electronic components become increasingly thin and compact, the challenge to form a coverlay with both low gloss and low color becomes even more difficult. In some cases, the need for thinner coverlays limits the use of matting agents, which may have particle sizes on the order of the thickness of the film. A need exists for a single layer polymer film that is matte in appearance, has deep, rich saturated colors, as well as providing sufficient optical density to provide visual security when used as a coverlay while having acceptable electrical properties (e.g., dielectric strength) mechanical properties, and durability to handling and circuit processing. This film should also be more resistive against post treatment etching processes.

SUMMARY

In a first aspect, a single layer polymer film includes 25 to 97.5 wt % of a polyimide having a refractive index of 1.74 or less, 0.5 to 20 wt % of a matting agent and 1 to 30 wt % of a black colorant. On an air side, the single layer polymer film has an L* color of 33 or less and a 60° gloss of 10 or less.

In a second aspect, a coverlay for a printed circuit board includes the single layer polymer film of the first aspect.

In a third aspect, a single layer polymer film includes 80 to 99 wt % of a polyimide having a refractive index of 1.74 or less and 1 to 30 wt % of a black colorant. A surface of the single layer polymer film has been textured and has a maximum roughness ($S_{pv}$) of 7 μm or more, an L* of 33 or less and a 60° gloss of 10 or less.

In a fourth aspect, a coverlay for a printed circuit board includes the single layer polymer film of the third aspect.

The foregoing general description and the following detailed description are exemplary and explanatory only and are not restrictive of the invention, as defined in the appended claims.

DETAILED DESCRIPTION

In a first aspect, a single layer polymer film includes 25 to 97.5 wt % of a polyimide having a refractive index of 1.74 or less, 0.5 to 20 wt % of a matting agent and 1 to 30 wt % of a black colorant. On an air side, the single layer polymer film has an L* color of 33 or less and a 60° gloss of 10 or less.

In one embodiment of the first aspect, the single layer polymer film further includes 50 wt % or less of a submicron particle selected from the group consisting of submicron fumed metal oxides, submicron colloidal metal oxides and mixtures thereof.

In another embodiment of the first aspect, the polyimide includes a dianhydride selected from the group consisting of aromatic dianhydrides, aliphatic dianhydrides and mixtures thereof.

In still another embodiment of the first aspect, the polyimide includes a fluorinated dianhydride.

In yet another embodiment of the first aspect, the polyimide includes a diamine selected from the group consisting of aromatic diamines, aliphatic diamines and mixtures thereof.

In still yet another embodiment of the first aspect, the polyimide includes a fluorinated diamine.

In a further embodiment of the first aspect, the matting agent is selected from the group consisting of silica, alumina, zirconia, boron nitride, barium sulfate, polyimide particles, calcium phosphate, talc and mixtures thereof.

In still a further embodiment of the first aspect, the single layer polymer film has a thickness in the range of from 4 to 125 μm.

In yet a further embodiment of the first aspect, the polyimide has a refractive index of 1.69 or less.

In still yet a further embodiment of the first aspect, the single layer polymer film has an L* color of 33 or less and a 60° gloss of 10 or less on both sides.

In a second aspect, a coverlay for a printed circuit board includes the single layer polymer film of the first aspect.

In a third aspect, a single layer polymer film includes 80 to 99 wt % of a polyimide having a refractive index of 1.74 or less and 1 to 30 wt % of a black colorant. A surface of the single layer polymer film has been textured and has a maximum roughness ($S_{pv}$) of 7 μm or more, an L* of 33 or less and a 60° gloss of 10 or less.

In one embodiment of the third aspect, the texturing is provided by abrasive-blasting.

In another embodiment of the third aspect, the single layer polymer film further includes 20 wt % or less of a submicron particle selected from the group consisting of submicron fumed metal oxides, submicron colloidal metal oxides and mixtures thereof.

In yet another embodiment of the third aspect, the polyimide includes a dianhydride selected from the group consisting of aromatic dianhydrides, aliphatic dianhydrides and mixtures thereof.

In still another embodiment of the third aspect, the polyimide includes a fluorinated dianhydride.

In still yet another embodiment of the third aspect, the polyimide includes a diamine selected from the group consisting of aromatic diamines, aliphatic diamines and mixtures thereof.

In a further embodiment of the third aspect, the polyimide includes a fluorinated diamine.

In yet a further embodiment of the third aspect, the single layer polymer film has a thickness in the range of from 4 to 125 μm.

In a fourth aspect, a coverlay for a printed circuit board includes the single layer polymer film of the third aspect.

Many aspects and embodiments have been described above and are merely exemplary and not limiting. After reading this specification, skilled artisans appreciate that other aspects and embodiments are possible without departing from the scope of the invention. Other features and advantages of the invention will be apparent from the following detailed description, and from the claims.

Depending upon context, "diamine" as used herein is intended to mean: (i) the unreacted form (i.e., a diamine monomer); (ii) a partially reacted form (i.e., the portion or portions of an oligomer or other polymer precursor derived from or otherwise attributable to diamine monomer) or (iii) a fully reacted form (the portion or portions of the polymer derived from or otherwise attributable to diamine monomer). The diamine can be functionalized with one or more moieties, depending upon the particular embodiment selected in the practice of the present invention.

Indeed, the term "diamine" is not intended to be limiting (or interpreted literally) as to the number of amine moieties in the diamine component. For example, (ii) and (iii) above include polymeric materials that may have two, one, or zero amine moieties. Alternatively, the diamine may be functionalized with additional amine moieties (in addition to the amine moieties at the ends of the monomer that react with dianhydride to propagate a polymeric chain). Such additional amine moieties could be used to crosslink the polymer or to provide other functionality to the polymer.

Similarly, the term "dianhydride" as used herein is intended to mean the component that reacts with (is complimentary to) the diamine and in combination is capable of reacting to form an intermediate (which can then be cured into a polymer). Depending upon context, "anhydride" as used herein can mean not only an anhydride moiety per se, but also a precursor to an anhydride moiety, such as: (i) a pair of carboxylic acid groups (which can be converted to anhydride by a de-watering or similar-type reaction); or (ii) an acid halide (e.g., chloride) ester functionality (or any other functionality presently known or developed in the future which is) capable of conversion to anhydride functionality.

Depending upon context, "dianhydride" can mean: (i) the unreacted form (i.e. a dianhydride monomer, whether the anhydride functionality is in a true anhydride form or a precursor anhydride form, as discussed in the prior above paragraph); (ii) a partially reacted form (i.e., the portion or portions of an oligomer or other partially reacted or precursor polymer composition reacted from or otherwise attributable to dianhydride monomer) or (iii) a fully reacted form (the portion or portions of the polymer derived from or otherwise attributable to dianhydride monomer).

The dianhydride can be functionalized with one or more moieties, depending upon the particular embodiment selected in the practice of the present invention. Indeed, the term "dianhydride" is not intended to be limiting (or interpreted literally) as to the number of anhydride moieties in the dianhydride component. For example, (i), (ii) and (iii) (in the paragraph above) include organic substances that may have two, one, or zero anhydride moieties, depending upon whether the anhydride is in a precursor state or a reacted state. Alternatively, the dianhydride component may be functionalized with additional anhydride type moieties (in addition to the anhydride moieties that react with diamine to provide a polymer). Such additional anhydride moieties could be used to crosslink the polymer or to provide other functionality to the polymer.

Any one of a number of polyimide, polyamide imide or polyester imide manufacturing processes may be used to prepare low haze polymer films. It would be impossible to discuss or describe all possible manufacturing processes useful in the practice of the present invention. It should be appreciated that the monomer systems of the present invention are capable of providing the above-described advantageous properties in a variety of manufacturing processes. The compositions of the present invention can be manufactured as described herein and can be readily manufactured in any one of many (perhaps countless) ways of those of ordinarily skilled in the art, using any conventional or non-conventional manufacturing technology.

Although methods and materials similar or equivalent to those described herein can be used in the practice or testing of the present invention, suitable methods and materials are described herein.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

In describing certain polymers, it should be understood that sometimes applicants are referring to the polymers by the monomers used to make them or the amounts of the monomers used to make them. While such a description may not include the specific nomenclature used to describe the final polymer or may not contain product-by-process terminology, any such reference to monomers and amounts should be interpreted to mean that the polymer is made from those monomers or that amount of the monomers, and the corresponding polymers and compositions thereof.

The materials, methods, and examples herein are illustrative only and, except as specifically stated, are not intended to be limiting. As used herein, the terms "comprises," "comprising," "includes," "including," "has," "having" or any other variation thereof, are intended to cover a non-exclusive inclusion. For example, a method, process, article, or apparatus that comprises a list of elements is not necessarily limited only those elements but may include other elements not expressly listed or inherent to such method, process, article, or apparatus. Further, unless expressly stated to the contrary, "or" refers to an inclusive or and not to an exclusive or. For example, a condition A or B is satisfied by any one of the following: A is true (or present)

and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

Organic Solvents

Useful organic solvents for the synthesis of the polymers of the present invention are preferably capable of dissolving the polymer precursor materials. Such a solvent should also have a relatively low boiling point, such as below 225° C., so the polymer can be dried at moderate (i.e., more convenient and less costly) temperatures. A boiling point of less than 210, 205, 200, 195, 190, or 180° C. is preferred.

Solvents of the present invention may be used alone or in combination with other solvents (i.e., cosolvents). Useful organic solvents include: N-methylpyrrolidone (NMP), dimethylacetamide (DMAc), N,N'-dimethyl-formamide (DMF), dimethyl sulfoxide (DMSO), tetramethyl urea (TMU), diethyleneglycol diethyl ether, 1,2-dimethoxyethane (monoglyme), diethylene glycol dimethyl ether (diglyme), 1,2-bis-(2-methoxyethoxy) ethane (triglyme), bis [2-(2-methoxyethoxy) ethyl)] ether (tetraglyme), gamma-butyrolactone, and bis-(2-methoxyethyl) ether, tetrahydrofuran. In one embodiment, preferred solvents include N-methylpyrrolidone (NMP) and dimethylacetamide (DMAc).

Co-solvents can generally be used at about 5 to 50 weight percent of the total solvent, and useful such co-solvents include xylene, toluene, benzene, "Cellosolve" (glycol ethyl ether), and "Cellosolve acetate" (hydroxyethyl acetate glycol monoacetate).

Diamines

In one embodiment, a suitable diamine for forming the polyimide film can include an aliphatic diamine, such as 1,2-diaminoethane, 1,6-diaminohexane, 1,4-diaminobutane, 1,7-diaminoheptane, 1,8-diaminooctane, 1,9-diaminononane, 1,10-diaminodecane (DMD), 1,11-diaminoundecane, 1,12-diaminododecane (DDD), 1,16-hexadecamethylenediamine, 1,3-bis(3-aminopropyl)-tetramethyldisiloxane, isophoronediamine, bicyclo[2.2.2]octane-1,4-diamine and combinations thereof. Other aliphatic diamines suitable for practicing the invention include those having six to twelve carbon atoms or a combination of longer chain and shorter chain diamines so long as both developability and flexibility are maintained. Long chain aliphatic diamines increase flexibility.

In one embodiment, a suitable diamine for forming the polyimide film can further include a fluorinated aromatic diamine, such as 2,2'-bis(trifluoromethyl) benzidine (TFMB), trifluoromethyl-2,4-diaminobenzene, trifluoromethyl-3,5-diaminobenzene, 2,2'-bis-(4-aminophenyl)-hexafluoro propane, 4,4'-diamino-2,2'-trifluoromethyl diphenyloxide, 3,3'-diamino-5,5'-trifluoromethyl diphenyloxide, 9.9'-bis(4-aminophenyl)fluorene, 4,4'-trifluoromethyl-2,2'-diaminobiphenyl, 4,4'-oxy-bis-[2-trifluoromethyl)benzene amine] (1,2,4-OBABTF), 4,4'-oxy-bis-[3-trifluoromethyl)benzene amine], 4,4'-thio-bis-[(2-trifluoromethyl)benzene-amine], 4,4'-thiobis[(3-trifluoromethyl)benzene amine], 4,4'-sulfoxyl-bis-[(2-trifluoromethyl)benzene amine, 4,4'-sulfoxyl-bis-[(3-trifluoromethyl)benzene amine], 4,4'-keto-bis-[(2-trifluoromethyl)benzene amine], 1,1-bis[4'-(4"-amino-2"-trifluoromethylphenoxy)phenyl]cyclopentane, 1,1-bis[4'-(4"-amino-2"-trifluoromethylphenoxy)phenyl]cyclohexane, 2-trifluoromethyl-4,4'-diaminodiphenyl ether; 1,4-(2'-trifluoromethyl-4',4"-diaminodiphenoxy)-benzene, 1,4-bis(4'-aminophenoxy)-2-[(3',5'-ditrifluoromethyl)phenyl]benzene, 1,4-bis[2'-cyano-3'("4-amino phenoxy)phenoxy]-2-[(3',5'-ditrifluoro-methyl)phenyl]benzene (6FC-diamine), 3,5-diamino-4-methyl-2',3',5',6'-tetrafluoro-4'-tri-fluoromethyldiphenyloxide, 2,2-Bis[4'(4"-aminophenoxy)phenyl] phthalein-3',5'-bis(trifluoromethyl)anilide (6FADAP) and 3,3',5,5'-tetrafluoro-4,4'-diamino-diphenylmethane (TFDAM). In a specific embodiment, the fluorinated diamine is 2,2'-bis(trifluoromethyl) benzidine (TFMB). In one embodiment, a fluorinated aromatic diamine can be present in a range of from 40 to 95 mole percent, based on the total diamine content of the polyimide. In a more specific embodiment, the fluorinated aromatic diamine can be present in a range of from 50 to 75 mole percent, based on the total diamine content of the polyimide.

In one embodiment, any number of additional diamines can be used in forming the polyimide film, including p-phenylenediamine (PPD), m-phenylenediamine (MPD), 2,5-dimethyl-1,4-diaminobenzene, 2,5-dimethyl-1,4-phenylenediamine (DPX), 2,2-bis-(4-aminophenyl) propane, 1,4-naphthalenediamine, 1,5-naphthalenediamine, 4,4'-diaminobiphenyl, 4,4"-diamino terphenyl, 4,4'-diamino benzanilide, 4,4'-diaminophenyl benzoate, 4,4'-diaminobenzophenone, 4,4'-diaminodiphenylmethane (MDA), 4,4'-diaminodiphenyl sulfide, 4,4'-diaminodiphenyl sulfone, 3,3'-diaminodiphenyl sulfone, bis-(4-(4-aminophenoxy)phenyl sulfone (BAPS), 4,4'-bis-(aminophenoxy)biphenyl (BAPB), 4,4'-diaminodiphenyl ether (ODA), 3,4'-diaminodiphenyl ether, 4,4'-diaminobenzophenone, 4,4'-isopropylidenediani-line, 2,2'-bis-(3-aminophenyl)propane, N,N-bis-(4-aminophenyl)-n-butylamine, N,N-bis-(4-aminophenyl) methylamine, 1,5-diaminonaphthalene, 3,3'-dimethyl-4,4'-diaminobiphenyl, m-amino benzoyl-p-amino anilide, 4-aminophenyl-3-aminobenzoate, N,N-bis-(4-aminophenyl) aniline, 2,4-diaminotoluene, 2,5-diaminotoluene, 2,6-diaminotoluene, 2,4-bis 2,4-diamine-6-chlorotoluene, 2,4-bis-(beta-amino-t-butyl) toluene, bis-(p-beta-amino-t-butyl phenyl) ether, p-bis-2-(2-methyl-4-aminopentyl) benzene, m-xylylene diamine, and p-xylylene diamine.

Other useful diamines include 1,2-bis-(4-aminophenoxy) benzene, 1,3-bis-(4-aminophenoxy) benzene, 1,2-bis-(3-aminophenoxy)benzene, 1,3-bis-(3-aminophenoxy) benzene, 1-(4-aminophenoxy)-3-(3-aminophenoxy) benzene, 1,4-bis-(4-aminophenoxy) benzene, 1,4-bis-(3-aminophenoxy) benzene, 1-(4-aminophenoxy)-4-(3-aminophenoxy) benzene, 2,2-bis-(4-[4-aminophenoxy]phenyl) propane (BAPP), 2,2'-bis-(4-phenoxy aniline) isopropylidene, 2,4,6-trimethyl-1,3-diaminobenzene and 2,4,6-trimethyl-1,3-diaminobenzene Dianhydrides In one embodiment, any number of suitable dianhydrides can be used in forming the polyimide film. The dianhydrides can be used in their tetra-acid form (or as mono, di, tri, or tetra esters of the tetra acid), or as their diester acid halides (chlorides). However, in some embodiments, the dianhydride form can be preferred, because it is generally more reactive than the acid or the ester.

Examples of suitable dianhydrides include 3,3',4,4'-biphenyl tetracarboxylic dianhydride (BPDA), 1,2,5,6-naphthalene tetracarboxylic dianhydride, 1,4,5,8-naphthalene tetracarboxylic dianhydride, 2,3,6,7-naphthalene tetracarboxylic dianhydride, 2-(3',4'-dicarboxyphenyl) 5,6-dicarboxybenzimidazole dianhydride, 2-(3',4'-dicarboxyphenyl) 5,6-dicarboxybenzoxazole dianhydride, 2-(3',4'-dicarboxyphenyl) 5,6-dicarboxybenzothiazole dianhydride, 2,2',3,3'-benzophenone tetracarboxylic dianhydride, 2,3,3',4'-benzophenone tetracarboxylic dianhydride, 3,3',4,4'-benzophenone tetracarboxylic dianhydride (BTDA), 2,2',3,3'-biphenyl tetracarboxylic dianhydride, 2,3,3',4'-biphenyl tetracarboxylic dianhydride, bicyclo-[2,2,2]-octen-(7)-2,3,5,6-tetracarboxylic-2,3,5,6-dianhydride, 4,4'-thio-diphthalic anhydride, bis (3,4-dicarboxyphenyl) sulfone dianhydride, bis (3,4-dicarboxyphenyl) sulfoxide dianhydride (DSDA), bis (3,4-dicarboxyphenyl oxadiazole-1,3,4) p-phenylene dianhydride, bis (3,4-dicarboxyphenyl) 2,5-oxadiazole 1,3,4-dianhydride, bis 2,5-(3',4'-dicarboxydiphenylether) 1,3,4-oxadiazole dianhydride, 4,4'-oxydiphthalic anhydride (ODPA), bis (3,4-dicarboxyphenyl) thio ether dianhydride, bisphenol A dianhydride (BPADA), bisphenol S dianhydride, bis-1,3-isobenzofurandione, 1,4-bis(4,4'-oxyphthalic anhydride) benzene, bis (3,4-dicarboxyphenyl) methane dianhydride, cyclopentadienyl tetracarboxylic acid dianhydride, cyclopentane tetracarboxylic dianhydride, ethylene tetracarboxylic acid dianhydride, perylene 3,4,9,10-tetracarboxylic dianhydride, pyromellitic dianhydride (PMDA), tetrahydrofuran tetracarboxylic dianhydride, 1,3-bis-(4,4'-oxydiphthalic anhydride) benzene, 2,2-bis(3,4-dicarboxyphenyl) propane dianhydride, 2,6-dichloronaphthalene-1,4,5,8-tetracarboxylic dianhydride, 2,7-dichloronaphthalene-1,4,5,8-tetracarboxylic dianhydride, 2,3,6,7-tetrachloronaphthalene-1,4,5,8-tetracarboxylic dianhydride, phenanthrene-1,8,9,10-tetracarboxylic dianhydride, pyrazine-2,3,5,6-tetracarboxylic dianhydride, benzene-1,2,3,4-tetracarboxylic dianhydride and thiophene-2,3,4,5-tetracarboxylic dianhydride.

In one embodiment, a suitable dianhydride can include an alicyclic dianhydride, such as cyclobutane dianhydride (CBDA), cyclohexane dianhydride, 1,2,3,4-cyclopentanetetracarboxylic dianhydride (CPDA), hexahydro-4,8-ethano-1H,3H-benzo[1,2-c:4,5-c']difuran-1,3,5,7-tetrone (BODA), 3-(carboxymethyl)-1,2,4-cyclopentanetricarboxylic acid 1,4:2,3-dianhydride (TCA) and meso-butane-1,2,3,4-tetracarboxylic acid dianhydride.

In one embodiment, a suitable dianhydride for forming the polyimide film can include a fluorinated dianhydride, such as 4,4'-(hexafluoroisopropylidene)diphthalic anhydride (6FDA) and 9,9-bis (trifluoromethyl)-2,3,6,7-xanthene tetracarboxylic dianhydride. In a specific embodiment, the fluorinated dianhydride is 4,4'-(hexafluoroisopropylidene)diphthalic anhydride (6FDA).

Matting Agents

In one embodiment, the polymer layer contains 0.5 to 20 wt % of a matting agent selected from the group consisting of silica, alumina, zirconia, boron nitride, barium sulfate, polyimide particles, calcium phosphate, talc or mixtures thereof. In some embodiments, the polymer layer contains between and including any two of the following: 0.5, 1, 5, 10, 15 and 20 wt % matting agent. In one embodiment, a matting agent has a particle size in the range of from about 2 to about 10 µm, or from about 3 to about 9 µm, or from about 5 to about 7 µm.

Black Colorant

In one embodiment, the polymer layer may contain 1 to 30 wt % of a black colorant. In some embodiments, the polymer layer contains between and including any two of the following: 1, 5, 10, 15, 20 and 30 wt % of a black colorant.

Black colorant is intended to mean a carbon black, such as a low conductivity carbon black (e.g., channel type black, furnace black or lamp black) or a black pigment or dye. In some embodiments, a low conductivity carbon black is a surface oxidized carbon black. One method for assessing the extent of surface oxidation (of the carbon black) is to measure the carbon black's volatile content. The volatile content can be measured by calculating weight loss when calcined at 950° C. for 7 minutes. Generally speaking, a highly surface oxidized carbon black (high volatile content) can be readily dispersed into a polyamic acid solution (polyimide precursor), which in turn can be imidized into a (well dispersed) filled polyimide base polymer of the present disclosure. It is thought that if the carbon black particles (aggregates) are not in contact with each other, then electron tunneling, electron hopping or other electron flow mechanism are generally suppressed, resulting in lower electrical conductivity. In some embodiments, the low conductivity carbon black has a volatile content greater than or equal to 1%. In some embodiments, the low conductivity carbon black has a volatile content greater than or equal to 5, 9, or 13%. In some embodiments, furnace black may be surface treated to increase the volatile content. Typically, a low conductivity carbon black has a pH less than 6.

A uniform dispersion of isolated, carbon black particles (aggregates) not only decreases the electrical conductivity, but additionally tends to produce uniform color intensity. In some embodiments, the low conductivity carbon black is milled. In some embodiments, the mean particle size of the low conductivity carbon black is between (and optionally including) any two of the following sizes: 0.2, 0.3, 0.4, 0.5, 0.6, 0.7, 0.8, 0.9 and 1.0 µm. In some embodiments, the polymer layer contains between and including any two of the following: 1, 5, 10, 15 and 20 wt % carbon black.

In some embodiments, useful black pigments include: cobalt oxide, Fe—Mn—Bi black, Fe—Mn oxide spinel black, $(Fe,Mn)_2O_3$ black, copper chromite black spinel, lampblack, bone black, bone ash, bone char, hematite, black iron oxide, micaceous iron oxide, black complex inorganic color pigments (CICP), $(Ni,Mn,Co)(Cr,Fe)_2O_4$ black, aniline black, perylene black, anthraquinone black, chromium green-black hematite, chrome iron oxide, Pigment Green 17, Pigment Black 26, Pigment Black 27, Pigment Black 28, Pigment Brown 29, Pigment Brown 35, Pigment Black 30, Pigment Black 32, Pigment Black 33 or mixtures thereof.

Additional Pigments and Dyes

The polymer layer may optionally contain up to 40 wt % additional pigment or dye that is not black. In some embodiments, the polymer layer contains up to 40 wt % of a mixture of additional pigments and dyes. In some embodiments, the polymer layer contains between and including any two of the following: 1, 5, 10, 15, 20, 25, 30, 35 and 40 wt % additional pigment, dye or mixtures thereof.

Virtually any additional pigment (or combination of additional pigments) can be used in the performance of the present invention. In some embodiments, useful additional pigments include but are not limited to the following: Barium Lemon Yellow, Cadmium Yellow Lemon, Cadmium Yellow Lemon, Cadmium Yellow Light, Cadmium Yellow Middle, Cadmium Yellow Orange, Scarlet Lake, Cadmium Red, Cadmium Vermilion, Alizarin Crimson, Permanent Magenta, Van Dyke brown, Raw Umber Greenish, or Burnt Umber.

In some embodiments, the additional pigment is lithopone, zinc sulfide, barium sulfate, cobalt oxide, yellow iron oxide, orange iron oxide, red iron oxide, brown iron oxide, hematite, micaceous iron oxide, chromium (III) green, ultramarine blue, ultramarine violet, ultramarine pink, cyanide iron blue, cadmium pigments or lead chromate pigments.

In some embodiments, the additional pigment is complex inorganic color pigments (CICP) such as spinel pigments, rutile pigments, zircon pigments or bismuth vanadate yellow. In some embodiments, useful spinel pigments include but are not limited to: $Zn(Fe,Cr)_2O_4$ brown, $CoAl_2O_4$ blue, Co(AlCr)$_2$O$_4$ blue-green, or Co$_2$TiO$_4$ green. In some embodiments, useful rutile pigments include but are not limited to: Ti—Ni—Sb yellow, Ti—Mn—Sb brown, Ti—Cr—Sb buff, zircon pigments or bismuth vanadate yellow.

In another embodiment, the additional pigment is an organic pigment. In some embodiments, useful organic pigments include but are not limited to: Monoazo type, Diazo type, Benzimidazolones, Diarylide yellow, Monoazo yellow salts, Dinitaniline orange, Pyrazolone orange, Azo red, Naphthol red, Azo condensation pigments, Lake pigments, Copper Phthalocyanine blue, Copper Phthalocyanine green, Quinacridones, Diaryl Pyrrolopyrroles, Aminoanthraquinone pigments, Dioxazines, Isoindolinones, Isoindolines, Quinophthalones, phthalocyanine pigments, idanthrone pigments, pigment violet 1, pigment violet 3, pigment violet 19 or pigment violet 23. In yet another embodiment, the organic pigment is a Vat dye pigment, such as but not limited to: perylene, perinones or thioindigo. A uniform dispersion of isolated, individual pigment particles (aggregates) tends to produce uniform color intensity. In some embodiments, the pigment is milled. In some embodiments, the mean particle size of the additional pigment is between (and optionally including) any two of the following sizes: 0.2, 0.3, 0.4, 0.5, 0.6, 0.7, 0.8, 0.9 and 1.0 µm. In some embodiments, luminescent (fluorescent or phosphorescent), or pearlescent pigments can be used, alone, or in combination with other additional pigments or dyes.

Submicron Particles

In one embodiment, the polymer layer contains up to about 50 wt % of at least one submicron particle, such as a submicron fumed metal oxide (also known as pyrogenic metal oxide) or a submicron colloidal metal oxide or a mixture thereof. In some embodiments, the submicron fumed metal oxide is fumed alumina, fumed silica or mixtures thereof. The addition of a submicron fumed metal oxide surprisingly lowers the amount of colorant (such as black colorant) needed in the polymer layer to produce a film with an L* color less than about 33. The submicron fumed alumina and fumed silica, by themselves, in PI film, are sometimes white-ish or hazy, so it was unpredictable that their addition would actually lower the amount of colorant needed to produce deep, rich saturated colors. It is also surprising that other submicron metal oxides do not have the same effect. In one embodiment, the polymer layer includes up to about 30 wt %, or up to about 20 wt % of at least one submicron particle. In one embodiment, a submicron particle has a particle size of less than about 1 µm. In one embodiment, a submicron particle has a particle size in a range of from about 0.01 to about 1 µm, or from about 0.05 to about 0.5 µm.

The particle sizes of the submicron particles, black colorants and matting agents can be measured in the slurries by laser diffraction using a particle size analyzer, such as a LA-930 (Horiba, Instruments, Inc., Irvine Calif.), Mastersizer 3000 (Malvern Instruments, Inc., Westborough, Mass.) or LS-230 (Beckman Coulter, Inc., Indianapolis, Ind.). However, due to the tendency of the submicron particles to flocculate, it is sometime more accurate to measure particle size of these milled slurries by observing in an optical microscope.

Single Layer Polymer Films

The term "single layer polymer film" as used herein, refers to a layer of polymer film that has an essentially homogeneous composition throughout the layer, such that the monomers used to form the polymer are present throughout the thickness of the layer, and any fillers, such as matting agents, black colorants and submicron particles, are also distributed throughout the thickness of the layer. A single layer polymer film, while essentially homogeneous, may exhibit some gradation in composition of the layer over an area or through its thickness and especially at the surfaces of the film. In contrast, a polymer film that has distinct changes in composition across an area or a thickness of the film would not be a single layer polymer film. For example, a polyimide film with a core layer of one composition and thin outer layers of a different composition (such as different monomers used to form the polymer of the outer layers or different fillers in the outer layers) would not be a single layer polymer film.

In one embodiment, a single layer polymer film can include a polyimide, which can be produced by combining a diamine and a dianhydride (monomer or other polyimide precursor form) together with a solvent to form a polyamic acid (also called a polyamide acid) solution. The dianhydride and diamine can be combined in a molar ratio of about 0.90 to 1.10. The molecular weight of the polyamic acid formed therefrom can be adjusted by adjusting the molar ratio of the dianhydride and diamine.

In one embodiment, a polyamic acid casting solution is derived from the polyamic acid solution. The polyamic acid casting solution preferably comprises the polyamic acid solution can optionally be combined with conversion chemicals like: (i) one or more dehydrating agents, such as, aliphatic acid anhydrides (acetic anhydride, etc.) and/or aromatic acid anhydrides; and (ii) one or more catalysts, such as, aliphatic tertiary amines (triethyl amine, etc.), aromatic tertiary amines (dimethyl aniline, etc.) and heterocyclic tertiary amines (pyridine, picoline, isoquinoline, etc.). The anhydride dehydrating material it is often used in molar excess compared to the amount of amide acid groups in the polyamic acid. The amount of acetic anhydride used is typically about 2.0-4.0 moles per equivalent (repeat unit) of polyamic acid. Generally, a comparable amount of tertiary amine catalyst is used. Submicron particles, dispersed or suspended in solvent as described above, are then added to the polyamic acid solution.

In one embodiment, the polyamic acid solution, and/or the polyamic acid casting solution, is dissolved in an organic solvent at a concentration from about 5.0 or 10% to about 15, 20, 25, 30, 35 and 40% by weight.

The polyamic acid (and casting solution) can further comprise any one of a number of additives, such as processing aids (e.g., oligomers), antioxidants, light stabilizers, flame retardant additives, anti-static agents, heat stabilizers, ultraviolet absorbing agents, inorganic fillers or various reinforcing agents. Those skilled in the art will appreciated that depending on their refractive indices, size and how well dispersed they are, these additives can impact the overall haze of the low haze polymer film, and thus must be appropriately selected to not significantly increase haze. Inorganic fillers can include thermally conductive fillers, metal oxides, inorganic nitrides and metal carbides, and electrically conductive fillers like metals, graphitic carbon and carbon fibers. Common inorganic fillers are alumina, silica, silicon carbide, diamond, clay, boron nitride, aluminum nitride, titanium dioxide, dicalcium phosphate, and fumed metal oxides. Common organic fillers include polyaniline, polythiophene, polypyrrole, polyphenylenevinylene, and polydialkylfluorenes.

The solvated mixture (the polyamic acid casting solution) can then be cast or applied onto a support, such as an endless belt or rotating drum, to give a film. In one embodiment, the polyamic acid can be solution cast in the presence of an imidization catalyst. Use of an imidization catalyst can help to lower the imidization temperature and shorten the imidization time. Typical imidization catalysts can range from bases such as imidazole, 1-2-methylimidazole, 1,2-dimethylimidazole, 2-phenylimidazole, benzimidazole, isoquinoline, or substituted pyridines such as methyl pyridines, lutidine, and trialkylamines. Combinations of the tertiary amines with acid anhydrides can be used. These dehydration agents, which can act as co-catalysts, include acetic anhydride, propionic anhydride, n-butyric anhydride, benzoic anhydride and others. The ratio of these catalysts and their concentration in the polyamic acid layer will influence imidization kinetics and the film properties. Next, the solvent containing-film can be converted into a self-supporting film by heating at an appropriate temperature (thermal curing) together with conversion chemical reactants (chemical curing). The film can then be separated from the support, oriented such as by tentering, with continued thermal and chemical curing to provide a polyimide film.

Useful methods for producing polymer films containing a polyimide in accordance with the present invention can be found in U.S. Pat. Nos. 5,166,308 and 5,298,331, which are incorporate by reference into this specification for all teachings therein. Numerous variations are also possible, such as, (a) A method wherein the diamine components and dianhydride components are preliminarily mixed together and then the mixture is added in portions to a solvent while stirring.

(b) A method wherein a solvent is added to a stirring mixture of diamine and dianhydride components. (contrary to (a) above)

(c) A method wherein diamines are exclusively dissolved in a solvent and then dianhydrides are added thereto at such a ratio as allowing to control the reaction rate.

(d) A method wherein the dianhydride components are exclusively dissolved in a solvent and then amine components are added thereto at such a ratio to allow control of the reaction rate.

(e) A method wherein the diamine components and the dianhydride components are separately dissolved in solvents and then these solutions are mixed in a reactor.

(f) A method wherein the polyamic acid with excessive amine component and another polyamic acid with excessive dianhydride component are preliminarily formed and then reacted with each other in a reactor, particularly in such a way as to create a non-random or block copolymer.

(g) A method wherein a specific portion of the amine components and the dianhydride components are first reacted and then the residual diamine components are reacted, or vice versa.

(h) A method wherein the conversion chemicals (catalysts) are mixed with the polyamic acid to form a polyamic acid casting solution and then cast to form a gel film.

(i) A method wherein the components are added in part or in whole in any order to either part or whole of the solvent, also where part or all of any component can be added as a solution in part or all of the solvent.

(j) A method of first reacting one of the dianhydride components with one of the diamine components giving a first polyamic acid. Then reacting another dianhydride component with another amine component to give a second polyamic acid. Then combining the amic acids in any one of a number of ways prior to film formation.

In one embodiment, if the polyimide is soluble, the polyimide can be formed in solution, optionally with the addition of catalysts at higher temperatures (>50° C.). After filtration, the polyimide powder can be re-dissolved in a solvent. The polyimide solution can then be cast onto a support (e.g. a moving belt or rigid support) and coalesced to create a polyimide film. In one embodiment, the polyimide is cast onto a textured support, such that upon curing the single layer polymer film will have a textured surface.

In one embodiment, the single layer polymer film includes a polyimide with a low refractive index, such as less than about 1.74, or less than about 1.69, or less than about 1.60. Lowering the refractive index of the polyimide enables the formation of single layer polymer films with both low L* and gloss. Conventional polyimides exhibit considerably higher refractive indices (RI) due to the high contents of aromatic rings and imide structures than other common optical polymers. However, their poor transparency in the visible region is a serious obstacle for light trapping, raising the reflection from the film surface. The optical absorption of polyimides in the visible region is mainly caused by the intra- and intermolecular charge-transfer (CT) interactions between the electron-donating diamine and the electron-accepting dianhydride moieties. In one embodiment, the average refractive index, $n_{av}$, of a material can be estimated by the Lorentz-Lorenz equation:

$$\frac{n_{av}^2 - 1}{n_{av}^2 + 2} = \frac{4\pi}{3} \frac{a_{av}}{V_{int}} = \frac{4\pi}{3} \frac{\rho N_A}{M} \alpha_{av}$$

where $\alpha_{av}$ is the average molecular polarizability, $V_{int}$ is the intrinsic volume of the repeat unit, $\rho$ is the density, $N_A$ is Avogadro's number and M is the molecular weight. This equation can be simplified to:

$$\frac{n_{av}^2 - 1}{n_{av}^2 + 2} = \frac{4\pi}{3} K_p \frac{a_{av}}{V_{vdw}}$$

In which $K_p$ is the molecular packing coefficient and $V_{vdw}$ is the molecular van der Waals volume (see Y. Terui and S. Ando, *J Polym Sci: Part B Polymer Physics,* 42, 2354-2366 (2004)). Based on this equation, one method to minimize the refractive index of a polymer formulation is by minimizing the contribution from the $\alpha_{av}/V_{vdw}$ ratio. The variables of this ratio can be calculated empirically, semi-empirically or from ab initio principles. Utilizing this calculated ratio, monomers can be selected or eliminated to target a low refractive index. The aim is to decrease the polarizability of polyimide molecular chains, thus reducing the refractive indices of the polymer. The polarizability of polymers can be reduced by the introduction of electron withdrawing fluorine atoms or fluorinated substituents, the incorporation of alicyclic moieties, and the modification of the molecular skeleton by meta-substituted structures and bulky side chain groups.

In one embodiment, a single layer polymer film with can have an L* of about 33 or less and a 60° gloss (60GU) of about 10 or less. In one embodiment, a single layer polymer film can have an L* of about 30 or less or about 28 or less. In one embodiment, a single layer polymer film can have a 60° gloss of about 8 or less or about 6 or less.

The thickness of the single layer polymer film may be adjusted, depending on the intended purpose of the film or final application specifications. In one embodiment, the single layer polymer film has a total thickness in a range of from about 4 to about 125 µm, or from about 5 to about 50 µm, or from about 5 to 20 about µm.

In one embodiment, a single layer polymer film can be textured using mechanical or chemical means. By texturing the surface of the film using mechanical or chemical means, the amount of matting agent in a low gloss film can be reduced. This can be especially important for very thin single layer polymer films. In one embodiment, mechanical texturing can include processes that physically remove portions of the film surface, such as sand blasting or laser ablation. In one embodiment, for sand blasting, a single layer polymer film can be textured by spraying the surface of the film with minute sands in an abrasive-blasting (centrifugal-blasting) process, in which rotating impellers spray the sand using centrifugal force. In one embodiment, texturing can be provided through embossing or forming a film on a textured surface. In one embodiment, chemical texturing can be provided through lithography.

In one embodiment, a textured film can have both low L* color and low gloss even though the film does not contain a matting agent. In one embodiment, a single layer polymer film with a textured surface can have a maximum roughness ($S_{pv}$) of about 7 µm or more, an L* of about 33 or less and a 60° gloss (60GU) of about 10 or less. In one embodiment, the single layer polymer film with a textured surface can have an $S_{pv}$ of about 8 µm or more or about 9 µm or more. In one embodiment, a single layer polymer film with a textured surface can have an L* of about 30 or less or about 28 or less. In one embodiment, a single layer polymer film with a textured surface can have a 60° gloss of about 8 or less or about 6 or less.

Applications

In one embodiment, a single layer polymer film can be used in electronic device applications, such as a coverlay for a printed circuit board or other electronic components in an electronic device, providing protection from physical damage, oxidation and other contaminants that may adversely affect the function of the electronic components.

The advantageous properties of this invention can be observed by reference to the following examples that illustrate, but do not limit, the invention. All parts and percentages are by weight unless otherwise indicated.

EXAMPLES

Test Methods

CIE L*, a*, b* Color

Color measurements were performed using a ColorQuest® XE dual-beam spectrophotometer (Hunter Associates Laboratory, Inc., Reston, Va.), in the reflectance, specular included mode. The instrument was standardized prior to each use. Color data from the instrument were reported in the CIELAB 10°/D65 system, as L*, a*, b*. A L* value of 0 is pure black, while a L* value of 100 is pure white. Typically, a L* value difference of 1 unit is discernible to the eye.

Refractive Index

Refractive index measurements were performed using a Metricon® Model 2010 Prism Coupler (Metricon Corporation, Pennington, N.J.) using a laser wavelength of 633 nm (632.8 nm). The instrument was referenced prior to each use. Refractive index measurements were performed in transverse electric mode to report refractive index in the plane of the film.

60° Gloss

60° gloss (60GU) was measured using a Micro-TRI-gloss glossmeter (BYK—Gardner USA, Columbia, Md.). This instrument was calibrated prior to each use.

Particle Size

Particle size of filler particles in the slurries was measured by laser diffraction using a particle size analyzer (Mastersizer 3000, Malvern Instruments, Inc., Westborough, Mass.). DMAc was used as the carrier fluid.

Surface Roughness

Surface roughness was measured using a ZeGage™ Pro 3D optical profiler (Zygo Corp., Middlefield, Conn.) over a 167×167 µm area (0.28 mm²). The maximum roughness ($S_{pv}$, $S_z$ or $R_z$) is the sum of the maximum peak height ($S_p$) and the maximum valley depth ($S_v$) of the surface being measured, $S_{pv}=S_p+S_v$.

Black Colorant

A carbon black slurry was prepared, consisting of 80 wt % DMAc, 10 wt % PMDA/4,4'ODA polyamic acid prepolymer solution (20.6 wt % polyamic acid solids in DMAc), and 10 wt % carbon black powder (Special Black 4 (SB4), Orion Engineered Carbons LLC, Kingwood, Tex.). The ingredients were thoroughly mixed in a high-speed disc-type disperser. The slurry was then processed in a bead mill to disperse any agglomerates and to achieve the desired particle size. Median particle size was 0.3 µm.

A perylene black slurry was prepared, consisting of 80 wt % DMAc, 20 wt % perylene black powder (Paliogen® Black L 0086, BASF SE, Ludwigshafen, Germany). The ingredients were thoroughly mixed in a high-speed disc-type disperser.

Matting Agent

For some embodiments, a silica slurry was prepared, consisting of 75.4 wt % DMAc, 9.6 wt % PMDA/4,4'ODA polyamic acid prepolymer solution (20.6 wt % polyamic acid solids in DMAc) and 15.0 wt % silica powder (Syloid® C 807 or Syloid® C 803, W. R. Grace & Co., Columbia, Md.). The ingredients were thoroughly mixed in a high shear rotor-stator type mixer. In other embodiments, the silica powder was added as a dry powder. Median particle sizes are 7 µm (Syloid® C 807) and 3 µm (Syloid® C 803).

Submicron Particle

A fumed metal oxide slurry was prepared, consisting of 61.5 wt % DMAc, 35 wt % fumed silica powder (Aerosil® OX50, Evonik Corp., Parsippany, N.J.), and 3.5 wt % dispersing agent (Disperbyk-180, Byk Chemie GmbH, Germany). The ingredients were thoroughly mixed in a high shear disperser. The slurry was then processed in a bead mill to disperse any agglomerates and to achieve the desired particle size. Observation of the milled slurries in an optical microscope showed that the particle size was well below 1 micron.

Examples 1 to 3

For Examples 1 to 3 (E1-E3), 6FDA 1.0//TFMB 0.75/HMD 0.25 (molar equivalents) co-polyamic acid solution, in a 500-ml reaction vessel, equipped with mechanical stirring and nitrogen purged atmosphere, 321.0 g anhydrous DMAc and 50.0 g of 4,4'-(hexafluoroisopropylidene)diphthalic anhydride (6FDA) was added. 27.03 g of trifluoromethylbenzidine (TFMB) and 3.27 g of 1,6-diaminohexane (HMD) were added slowly over a period of 20 minutes.

The reaction mixture was stirred and heated at 40° C. for 16 hours. Total stoichiometric ratio was approximately 1:1. The mixture achieved a polymer viscosity of 75 to 250 poise at approximately 20% polyamic acid solids. The polymer solution was stored in a freezer until use.

Films were prepared by using the SB4 carbon black and fumed metal oxide (for E2) slurries as described above as well as a matting agent powder (Syloid® C 807). The filler slurries and powder were thoroughly mixed together with a high shear rotor-stator type mixer prior to addition into the polymer. The filler solution was then added into the polyamic acid solution, in the appropriate ratio, to produce the desired composition after curing. The resulting mixture was prepared by using a stainless-steel casting rod to manually cast the polyamic acid solution onto glass treated with a release agent. The polyamic acid films were dried at 90° C. to form a film of approximately 70 to 80 wt % solids. The film was peeled off the glass before placing on a pin frame, to hold flat, and placed in an oven at 150° C. and ramped to 300° C. over the course of 20 minutes. The film was removed from the 300° C. and allowed to cool at room temperature. The composition of the cured film was calculated from the composition of the components in the mixtures, excluding DMAc solvent (which is removed during curing) and accounting for removal of water during conversion of polyamic acid to polyimide.

Example 4

For Example 4 (E4), ODPA 0.5/PMDA0.5//MPD 0.5/BAPP 0.5, in a 300-ml reaction vessel, equipped with mechanical stirring and nitrogen purged atmosphere, 148.2 g anhydrous DMAc and 20.48 g of 2,2-Bis[4-(4-aminophenoxy)phenyl]propane (BAPP) and 5.40 g of m-Phenylenediamine (MPD) was added. 10.45 g of pyromellitic dianhydride (PMDA) and 15.48 g of 4,4'-oxydiphthalic anhydride (ODPA) were added slowly over a period of 20 minutes.

The reaction mixture was stirred until all monomers were reacted. Total stoichiometric ratio was approximately 0.98:1. The polymer was polymerized ("finished") to increase the molecular weight and provide the desired viscosity using small additions of PMDA solution in DMAc. The polymer solution was stored in a freezer until use.

Films were prepared as described for E1-E3 above using, except that perylene black was used instead of carbon black, and for the curing step, the film was placed in an oven at 150° C. and ramped to 350° C. over the course of 20 minutes, before removing and cooling at room temperature.

Comparative Example 1

For Comparative Example 1 (CE1), BPDA 1.0//PPD 1.0, in a 200-ml beaker, equipped with mechanical stirring in a nitrogen purged box, 160.17 g anhydrous DMAc and 10.95 g of p-phenylenediamine (PPD) was added. 28.89 g of 3,3',4,4'-biphenyl tetracarboxylic dianhydride (BPDA) was added slowly over a period of 20 minutes.

The reaction mixture was stirred until all monomers were reacted. Total stoichiometric ratio was approximately 0.97:1. The polymer was polymerized ("finished") to increase the molecular weight and provide the desired viscosity using small additions of PMDA solution in DMAc. The polymer solution was stored in a freezer until use.

Films were prepared as described for E1-E3 above, except that for the curing step, the film was placed in an oven at 150° C. and ramped to 320° C. over the course of 20 minutes, removed from the oven and placed in another oven at 400° C. for 5 minutes, before removing and cooling at room temperature.

E1-E4 and CE1 are summarized in Table 1. E1-E4 illustrate various concentrations of black colorant, matting agent and fumed metal oxide in polyimide films with refractive indices of less than 1.74. The BPDA//PPD monomer composition of CE1 has a higher refractive index of 1.84 and cannot achieve the same L* values of E1-E4. The cast side of the film correlates with the side that contacts the glass during casting, while the air side is the opposite side of the film that is not in contact or covered by another layer during curing of the film. Cast sides of all examples are higher gloss due to the smooth surface of the glass plate.

TABLE 1

| Example | E1 | E2 | E3 | E4 | CE1 |
| --- | --- | --- | --- | --- | --- |
| PI | 6FDA//TFMB/HMD | 6FDA//TFMB/HMD | 6FDA//TFMB/HMD | ODPA/PMDA//MPD/BAPP | BPDA//PPD |
| In-plane Refractive Index of PI | 1.57 | 1.57 | 1.57 | 1.67 | 1.84 |
| Carbon Black (wt %) | 20 | 1 | 5 | 0 | 5 |
| Perylene Black (wt %) | 0 | 0 | 0 | 20 | 0 |
| Matting Agent (wt %) | 8 | 0.5 | 20 | 10 | 20 |
| Fumed Metal Oxide (wt %) | 0 | 50 | 0 | 0 | 0 |
| L* (air side) | 25.68 | 28.61 | 25.81 | 30.65 | 36.24 |
| L* (cast side) | 26.44 | 31.51 | 27.44 | 30.94 | 36.02 |
| 60GU (air side) | 5.3 | 3.4 | 1.5 | 4.30 | 4.7 |
| 60GU (cast side) | 15.40 | 33.30 | 4.50 | 4.50 | 10.6 |
| Thickness (μm) | 33.6 | 46.0 | 34.6 | 34.2 | 31.75 |

Examples 5-6 and Comparative Examples 2-3

For Examples 5 and 6 (E5-E6) and Comparative Examples 2 and 3 (E2-E3), polyamic acid solutions were separately prepared by a chemical reaction between the appropriate molar equivalents of the monomers in dimethylacetamide (DMAc) solvent. Typically, the diamine dissolved in DMAc was stirred under nitrogen, and the dianhydride was added as a solid over a period of several minutes. The viscosity was adjusted by controlling the amount of dianhydride in the polyamic acid composition. The filler solutions and or powder were then added into the polyamic acid solution, in the appropriate ratio, to produce the desired composition after curing and mixed using a high shear mixer. For the matting agent of E6, a silica slurry of Syloid® C 803 (3 μm $SiO_2$) was used. The polymer mixture was cooled to approximately 6° C., conversion chemicals acetic anhydride (0.14 cm³/cm³ polymer solution) and 3-picoline (0.15 cm³/cm³ polymer solution) were added and mixed. For CE3 and E6, a film was cast using a slot die onto a 90° C. rotating drum. The resulting gel film was stripped off the drum and fed into a tenter oven, where it was dried and cured to a solids level greater than 98%, using convective and radiant heating. For CE2 and E5, a film was prepared by using a stainless-steel casting rod to manually cast the polyamic acid solution onto a smooth mylar sheet on top of glass. The polyamic acid films were dried at 90° C. to form a film. The film was peeled off the glass before placing on a pin frame, to hold flat, and placed in an oven at 120° C. and ramped to 350° C. over the course of 40 minutes. The film was removed from the 350° C. oven and allowed to cool at room temperature. The composition of the cured film was calculated from the composition of the components in the mixtures, excluding DMAc solvent (which is removed during curing) and accounting for removal of water during conversion of polyamic acid to polyimide.

Single layer polymer films as described above were textured by mechanical means (abrasive blasting). The hardness, density, size, and shape of the abrasive media along with process parameters impact the surface topography after blasting. Process parameters can include the following: abrasive flow rate, impact velocity, and blasting time. For abrasive blasting, a polymer film was textured by spraying with minute particles of sand in an abrasive-blasting (wheel blasting) process, in which rotating impellers spray the sand using centrifugal force.

E5-E6 and CE2-CE3 are summarized in Table 2. While the polyimide composition of CE2 has a desirable refractive index and good L*, the texturing of the film is not enough to sufficiently lower the gloss. For CE3, a polyimide composition with high refractive index does not have sufficiently low L*, even when the film surface has been well roughened. E5 and E6 use polyimide compositions with low refractive index, and suitable roughening of the film surface reduces both L* and gloss to desirable levels.

TABLE 2

| Example | PI Composition | Matting Agent (wt %) | Carbon Black (wt %) | In-plane RI of PI | Initial L* | Initial 60GU | Initial $S_{pv}$ | Sandblasted L* | Sandblasted 60GU | Sandblasted $S_{pv}$ |
|---|---|---|---|---|---|---|---|---|---|---|
| CE2 | ODPA/PMDA//MPD/BAPP | 0 | 5 | 1.67 | 31.46 | 115 | 0.760 | 30.22 | 35.5 | 6.362 |
| CE3 | BPDA/PMDA//ODA/PPD | 0 | 5.75 | 1.80 | 34.76 | 122 | 3.333 | 33.36 | 4.45 | 7.794 |
| E5 | ODPA/PMDA//MPD/BAPP | 0 | 5 | 1.67 | 31.58 | 113 | 1.062 | 28.05 | 6.0 | 9.415 |
| E6 | PMDA//ODA | 2 | 4 | 1.73 | 34.47 | 24.1 | 6.473 | 31.66 | 6.2 | 7.462 |

Note that not all of the activities described above in the general description are required, that a portion of a specific activity may not be required, and that further activities may be performed in addition to those described. Still further, the order in which each of the activities are listed are not necessarily the order in which they are performed. After reading this specification, skilled artisans will be capable of determining what activities can be used for their specific needs or desires.

In the foregoing specification, the invention has been described with reference to specific embodiments. However, one of ordinary skill in the art appreciates that various modifications and changes can be made without departing from the scope of the invention as set forth in the claims below. All features disclosed in this specification may be replaced by alternative features serving the same, equivalent or similar purpose. Accordingly, the specification and figures are to be regarded in an illustrative rather than a restrictive sense and all such modifications are intended to be included within the scope of the invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

What is claimed is:

1. A single layer polymer film comprising:
   25 to 97.5 wt % of a polyimide having a refractive index of 1.74 or less;
   0.5 to 20 wt % of a matting agent; and
   1 to 30 wt % of a black colorant, wherein:
   the wt % of each component is based on the total weight of the film; and
   on an air side, the single layer polymer film has an L* color of 33 or less and a 60° gloss of 10 or less.

2. The single layer polymer film of claim 1, further comprising 50 wt % or less of a submicron particle selected from the group consisting of submicron fumed metal oxides, submicron colloidal metal oxides and mixtures thereof.

3. The single layer polymer film of claim 1, wherein the polyimide comprises a dianhydride selected from the group consisting of aromatic dianhydrides, aliphatic dianhydrides and mixtures thereof.

4. The single layer polymer film of claim 1, wherein the polyimide comprises a fluorinated dianhydride.

5. The single layer polymer film of claim 1, wherein the polyimide comprises a diamine selected from the group consisting of aromatic diamines, aliphatic diamines and mixtures thereof.

6. The single layer polymer film of claim 1, wherein the polyimide comprises a fluorinated diamine.

7. The single layer polymer film of claim 1, wherein the matting agent is selected from the group consisting of silica, alumina, zirconia, boron nitride, barium sulfate, polyimide particles, calcium phosphate, talc and mixtures thereof.

8. The single layer polymer film of claim 1, wherein the single layer polymer film has a thickness in the range of from 4 to 125 μm.

9. The single layer polymer film of claim 1, wherein the polyimide has a refractive index of 1.69 or less.

10. The single layer polymer film of claim 1, wherein the single layer polymer film has an L* color of 33 or less and a 60° gloss of 10 or less on both sides.

11. A coverlay for a printed circuit board comprising the single layer polymer film of claim 1.

12. A single layer polymer film comprising:
   80 to 99 wt % of a polyimide having a refractive index of 1.74 or less; and
   1 to 30 wt % of a black colorant, wherein:
      the wt % of each component is based on the total weight of the film; and
      a surface of the single layer polymer film has been textured and has a maximum roughness ($S_{pv}$) of 7 μm or more, an L* of 33 or less and a 60° gloss of 10 or less.

13. The single layer polymer film of claim 12, wherein the texturing is provided by abrasive-blasting.

14. The single layer polymer film of claim 12 further comprising 20 wt % or less of a submicron particle selected from the group consisting of submicron fumed metal oxides, submicron colloidal metal oxides and mixtures thereof.

15. The single layer polymer film of claim 12, wherein the polyimide comprises a dianhydride selected from the group consisting of aromatic dianhydrides, aliphatic dianhydrides and mixtures thereof.

16. The single layer polymer film of claim 12, wherein the polyimide comprises a fluorinated dianhydride.

17. The single layer polymer film of claim 12, wherein the polyimide comprises a diamine selected from the group consisting of aromatic diamines, aliphatic diamines and mixtures thereof.

18. The single layer polymer film of claim 12, wherein the polyimide comprises a fluorinated diamine.

19. The single layer polymer film of claim 12, wherein the single layer polymer film has a thickness in the range of from 4 to 125 μm.

20. A coverlay for a printed circuit board comprising the single layer polymer film of claim 12.

* * * * *